United States Patent [19]
Yotti

[11] 3,902,399
[45] Sept. 2, 1975

[54] CONCRETE SCREW
[76] Inventor: Vincent Yotti, Rt. 2, Box 15, Melbourne Beach, Fla. 32901
[22] Filed: Nov. 27, 1972
[21] Appl. No.: 309,742

Related U.S. Application Data
[63] Continuation-in-part of Ser. No. 8,172, Feb. 3, 1970, abandoned, which is a continuation-in-part of Ser. No. 741,174, June 28, 1968, abandoned.

[52] U.S. Cl. .................................................. 85/46
[51] Int. Cl. ............................................ F16b 25/00
[58] Field of Search ............................. 85/46, 41, 44

[56] References Cited
UNITED STATES PATENTS

| | | | |
|---|---|---|---|
| 684,774 | 10/1901 | Baggs | 85/41 |
| 1,764,053 | 6/1930 | Reed et al | 85/41 |
| 1,784,754 | 12/1930 | Rosenberg | 85/44 |
| 2,015,159 | 9/1935 | Rosenberg | 85/44 |
| 2,174,578 | 10/1935 | Graham | 85/46 |

FOREIGN PATENTS OR APPLICATIONS
413,027  7/1934  United Kingdom..................... 85/46

Primary Examiner—Edward C. Allen
Attorney, Agent, or Firm—Rose & Edell

[57] ABSTRACT

A sheet metal screw or lag bolt is modified for use in concrete. The screw or bolt has a single thread which, starting about 4 convolutions from the pointed end of the screw, or immediately after spiral convolutions reach maximum thread diameter, is relieved, i.e. reduced in diameter, so that it does not engage the wall defining the hole in which the screw or bolt is inserted. Convolutions of the thread of the screw contiguous to the upper portion of the hole into which the screw or bolt is or may be threaded are left intact to align the screw or bolt in the hole and increase the holding action.

7 Claims, 7 Drawing Figures

INVENTOR
VINCENT YOTTI

CONCRETE SCREW

CROSS REFERENCE

The present application is a continuation-in-part of my co-pending application Ser. No. 8,172, filed Feb. 3, 1970, now abandoned, which was a continuation-in-part of then co-pending application Ser. No. 741,174, filed June 28, 1968, now abandoned.

BACKGROUND OF THE INVENTION

The present invention relates to a sheet metal screw or lag bolt, hereinafter referred to as a screw for purposes of simplicity, which is employed to anchor articles, channeled members or plates to concrete or related material. In the prior art various devices have been provided for anchoring objects to concrete. These devices usually consist of a sleeve, commonly known as a shield, of plastic, metal or fiber which is inserted into a hole in the concrete or related material, the body adapted to receive a screw which, upon insertion, expands the shield thereby producing a relatively strong holding force. These prior art devices add cost to any installation in the form of both cost of the shield and time of a workman in drilling average holes and related chores. In addition, shields are known to tear loose from concrete under heavy loads particularly where no holding force is exerted upon the top or exposed surface of the shield.

It is an object of the present invention to provide a screw which may be anchored directly in concrete or related material which is inexpensive, quick to apply, and which provides a greater holding force in concrete or related materials than the prior art devices employing shields for anchoring.

SUMMARY OF THE INVENTION

In accordance with the present invention, a conventional case hardened sheet metal screw or lag bolt or similar type of device having a single sharp thread, has a number of the convolutions of the thread adjacent the spiral group of convolutions beginning at the pointed end of the screw relieved in diameter so that the thread in such region does not engage the side of the hole in which the device is to be inserted.

For purposes of description, the convolutions of the single thread of the screw are considered to be divided into three groups, a first group adjacent the normally pointed end of the screw toward the center thereof, a second group extending from adjacent the head of the screw toward the center thereof and a third group of convolutions intermediate the first and second group. The first group of convolutions are of conventional thread design, increasing in diameter from the root diameter of the screw to the maximum diameter of the thread at about the third convolution. This first group consists of three to five convolutions providing one to three convolutions of maximum diameter.

The third or intermediate group of convolutions is of reduced diameter, the diameter of the convolutions being sufficiently small that the convolutions do not engage the sides of the hole. The second group of convolutions are of maximum diameter, the third group of convolutions being of such a length along the body of the screw that when the screw has been inserted in the hole to the maximum desired depth, of at least three to four of the convolutions of the second group are disposed in the upper portion of the hole.

The fact that convolutions of the second group engage the upper end of the hole helps to align the screw in the hole, to prevent wobble of the screw and to increase the holding force. In one embodiment of the screw of the present invention, the convolutions of the third or intermediate group which lie immediately adjacent the convolutions of the second group taper outwardly toward the head of the screw to assist in realigning the screw with the hole if misalignment has occurred initially.

Experience with attempts to insert a conventional sheet metal screw into concrete, brick or related materials demonstrates that when sufficient force is exerted on the screw to thread it into a hole of small enough diameter to produce a strong holding force, the screw fails; that is, it binds in the hole and if forced, the screw shears off at some point along its body. It has been found that the reason for the problem is the dust created by the first full-diameter, cutting convolution of the thread, accumulates in the spaces between the convolutions immediately following the first cutting convolution. The full-diameter, leading convolutions of the screw cut grooves into the side wall of the hole and the dust thus produced is fed upwardly by an Archimedes screw effect. The accumulation of dust is trapped between the screw and the wall of the hole and when a substantial quantity of dust has been accumulated over a relatively short length of the screw a strong binding effect is produced eventually causing the screw to shear. However, with the threads of a sheet metal screw, lag bolt or the like relieved as taught herein, the screw is readily inserted into a hole and produces an unexpectedly strong holding force.

The location of the relieved or removed convolutions is quite critical. The purpose of the relieved convolutions is to provide a storage area for the dust of sufficient size, both in depth and length to accumulate a substantial quantity of dust as a loosely compacted mass which does not produce a dangerous binding force on the screw.

The dispersal of concrete, brick, etc. dust along a substantial length of screw provides large areas of contact between the screw and dust on the one hand and the dust and concrete on the other. Considering the abrasive (high friction) nature of the materials involved, if the dust is permitted to become highly compacted prematurely or uncontrolled, as would be the case when a screw other than the screw of the present invention is used, the torque required to turn the screw exceeds its shearing strength and thus failure is produced.

It has been found that the majority of dust is produced by the first few convolutions of the thread as they form (cut) the threads into the wall of the hole. It was then postulated or subsequently found to be true that if this dust were immediately accumulated in a loosely compacted mass before it became dispersed along the length of the screw, then the area of contact and the frictional force between the screw and the dust and also the dust and the concrete could be controlled and the torque reduced. It has been found that if the convolutions of the thread immediately behind the first, second or third full diameter convolutions, and preferably behind the first such convolution, are relieved or removed to provide a storage volume of appropriate size, a relatively substantial quantity of dust in loosely compacted form may be immediately stored therein, thereby reducing frictional pressures involved and the area of contact between the dust and screw that would be involved over the same length of screw if the convolutions were not reduced in diameter or removed. The reduction in area of contact between dust and screw results from both the reduced length over which the dust is dispersed and also the fact that as volume of a regular figure increases the volume — surface area ratio decreases.

It is stated above that the dust storage area is located behind the first, second or third convolution of full diameter. It has been found by experimentation that when a hole of a diameter small enough to produce near maximum holding force on the screw is employed, the accumulation of dust is so rapid that serious and nearly always fatal dust accumulation are encountered if the relieved convolutions are located behind the fourth or more remote convolution of full diameter.

As has been stated the majority of dust is produced by the first few or cutting convolutions of the thread. This statement is not intended to imply that only those convolutions produce dust and in fact all of the convolutions, due to friction resulting from a tight fit of the convolutions in the cut groove, produce dust as they are threaded into the hole. The amount of dust produced, however, is considerably less than produced by the cutting action so that by employing a single "spaced" thread, a sufficient storage area is provided along each incremental length of the screw to prevent excessive frictional contact between the dust and the screw and the wall of the hole. By "spaced" thread is meant a thread with a large axial spacing between convolutions of the thread. The axial spacing between convolutions (the roots of the convolutions) should be approximately equal to the length of the axial crosssection of the convolution. This requirement is, as indicated above, related to storage of concrete or like dust. The thread must be a sharp crested thread; that is, a thread having a crest that is sufficiently sharp to readily cut into the concrete or like material during a thread cutting operation.

Only a single thread screw may be employed. The use of a multiple thread screw constrains the pitch of the thread to be so slight that it is extremely difficult to thread the screw into a hole. Screws with multiple threads are usually of the impact type; that is, driven in with a hammer and thus are not readily removable and reinsertable as are the screws of the present invention. Examples of threads that are suitable for use in the present invention are U.S.A. Standard Types A, AB, B, BP, BF and BT, all being of the spaced-sharp thread type.

The screws themselves must also be hardened (case hardened) to provide the necessary strength for the cutting and twisting operations.

It has been found that with a screw of the type meeting the above requirements, objects may be anchored to concrete quickly and easily and that the holding force provided by this device is greater than the holding force provided by corresponding shield inserts employed in the prior art. The device of the present invention is useful whenever it is desired to anchor an object to concrete, brick or like dust producing materials. The holding force is stronger than that provided by the shield device and the use of this screw greatly simplifies the operation. Large holes are not required as with shields and in consequence the drilling operation is much quicker. It is apparent to anyone who has employed shields that the hole required must be considerably larger than the diameter of the screw. Further the screw of the present invention may be employed for uses in which shields are not effective. For instance, where the hole in which the screw is to be inserted is bridged by the member to be anchored thereto, shields are extremely inefficient. The term "bridged" as employed herein means that the member to be anchored to the concrete does not abut the concrete in the neighborhood of the hole, such as when the member to be anchored to the concrete is a channel and the top wall of the channel is somewhat wider than the diameter of the hole in which the screw is inserted. Shields depend heavily on the force which is directed to the exposed surface or upon the top of the shield for their maximum holding ability. Therefore, in a bridged type of installation, there is no holding force applied against the top or exposed surface of shield as the screw is inserted and the channel member is pressed against the concrete base around the shield's exposed surface.

Comparison tests which are discussed in detail below have shown the screw of the present invention to be far superior to the prior art devices in ease of insertion and in the resultant holding force.

It is an object of the present invention to provide a screw for use directly in concrete, which device comprises a sheet metal screw, lag bolt, or the like having a number of convolutions of its thread reduced in diameter or removed so as to provide a dust storage area adjacent the cutting convolutions of the screw.

It is another object of the present invention to employ a sheet metal screw, lag bolt or the like having spaced sharp convolutions, a number of which adjacent the spiral convolutions which originate at the insertion end of the screw are relieved in diameter or removed so that the screw may be readily inserted in concrete.

BRIEF DESCRIPTION OF THE DRAWINGS

The above and still further objects, features and advantages of the present invention will become apparent upon consideration of the following detailed description of several specific embodiments thereof, especially when taken in conjunction with the accompanying drawings, wherein.

DESCRIPTION OF THE PREFERRED
EMBODIMENTS

Figure 1:
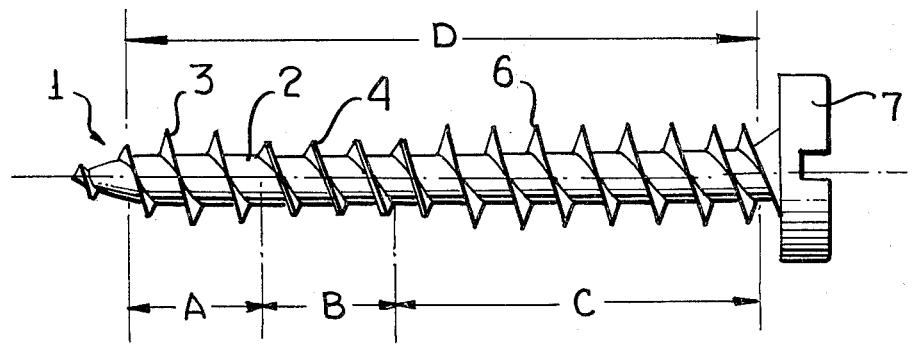
FIG. 1 of the accompanying drawings is a side view in elevation of a screw device modified in accordance with the teachings of the present invention.

Referring specifically to FIG. 1 of the accompanying drawings, there is illustrated a case-hardened sheet metal screw or lag bolt or like device generally designated by the reference numeral 1 having a shank 2 and a single thread having a plurality of convolutions formed thereon. The convolutions include a first group of three to five convolutions 3 of a size which increases generally uniformly from the root diameter to the maximum thread diameter in about three convolutions. This first group of convolutions is located adjacent the end of the screw which is normally initially inserted into a hole.

In one embodiment of the invention the convolutions, other than the convolutions 3, are divided into two groups with a second group of convolutions 6 extending from adjacent head 7 of the screw toward the center thereof, these convolutions being of full diameter. The length of the group of convolutions 6 is preferably such that at least three or four convolutions and preferably more of group 6 are located in the hole adjacent its upper end. A third group of convolutions generally designated by reference numeral 4 lie between the groups 3 and 6 and are of smaller diameter than the diameter of the hole in which the screw is to be inserted. As will become apparent relative to the description of FIGS. 3–5, the convolutions 4 in order to produce maximum holding force must commence after the first, second or third full diameter convolution of group 3 and preferably after the first such convolution so as to minimize the area of contact between dust, formed as the screw is threaded into a hole, and the screw and the wall of the hole.

Figure 2:
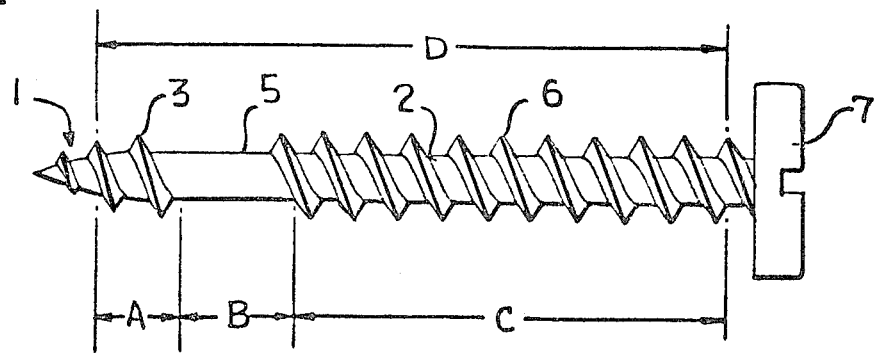
FIG. 2 of the accompanying drawings is a side view in elevation of another embodiment of the invention.

In practice, the convolutions 4 may be completely removed and this embodiment of the invention is illustrated in FIG. 2 of the accompanying drawings.

Figure 7:
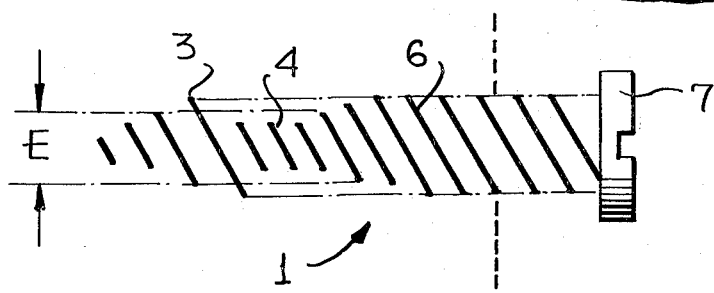
FIG. 7 is an elevational view partly in section illustrating use of the screw with a channeled member; this figure illustrating the arrangement employed for conducting tests described subsequently.

The screw device of FIGS. 1 and 2 may be employed for all purposes for which screw and shield arrangements are presently employed. In addition the screw of the invention may be employed in environments such as that illustrated in FIG. 7 in which shields are not effective. In FIG. 7, the hole 8 is drilled into a body 9 such as concrete or like material, and the hole 8 is bridged by a channel member 11 to be anchored to the concrete. The screw 1 is passed through a hole 12 in the channel member and threaded into the hole 8 in the concrete body 9.

In such an arrangement, the legs of the channel member 11 engage the surface of the body 9 at a relatively large distance from the periphery of the hole 8. In consequence, if a shield were to be employed, no holding force would be exerted against the top or exposed surface of the shield as is true when a flat plate is to be anchored to concrete. Thus the shield device merely pulls out of the hole and very inefficient in this environment.

Figure 3:
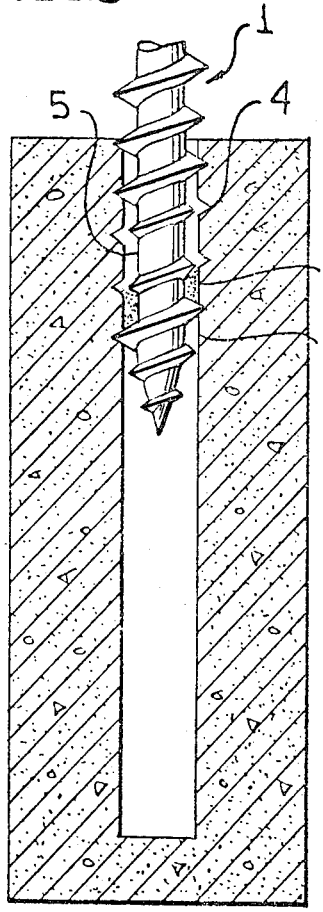
FIGS. 3–5 illustrate progress views of insertion of the screw of FIG. 1 into a hole.
Figure 4:
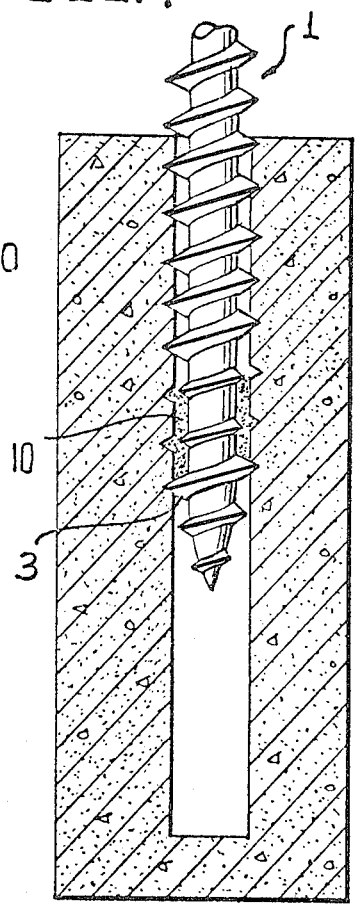
Figure 5:
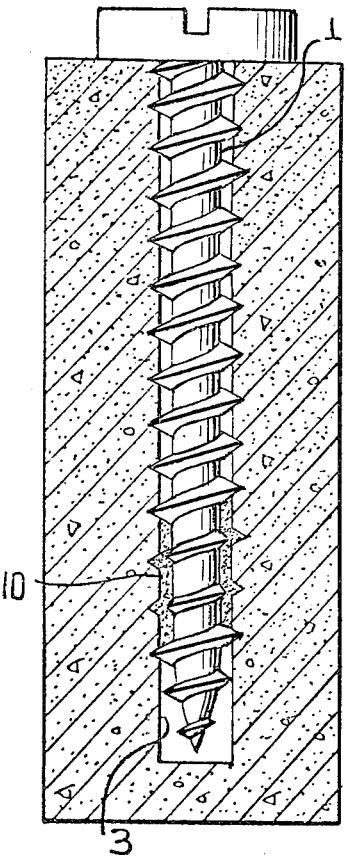

The reasons underlying each of the specific requirements of the screw of the present invention can best be defined by referring to what transpires as a screw is threaded into concrete, brick or other "dusting" or "abrasive" materials. Reference is made to FIGS. 3–5 of the accompanying drawings.

As the screw 1 is threaded into a hole the maximum diameter convolutions of group 3 of the thread cut into the wall of the hole and form a mating thread 5; thus the need for a sharp thread and case-hardened metal. The cutting operation produces concrete, brick, etc., dust 10 which is fed along the body of the screw by Archimedes screw action. The generation of dust by the maximum diameter convolutions of group 3 is quite rapid, whereas that produced by trailing convolutions is at a considerably slower rate.

If a standard sheet metal screw were to be employed, the accumulation of the highly abrasive dust between the screw and the wall of the hole would produce a binding force. By relieving a portion of the thread, the volume per unit length of screw in which dust may accumulate is increased and the surface area of frictional contact between the screw and the dust is decreased. Specifically, and reference is made to FIGS. 3–5, the empty space (volume) available to accumulate dust in the region of the convolutions 4 of reduced diameter is greater than if the full diameter convolutions were present. Thus the length of the screw over which the dust accumulates is reduced, reducing the area of contact between the dust and the wall. Further by removing or reducing the convolutions, the area of screw against which the dust presses is greatly reduced, at least by half. In consequence, the area of contact between the dust and both the wall and the screw is reduced and since total frictional force is a function of area the frictional force is reduced. Frictional force is also a function of pressure and again by employing the dust storage area and removing convolutions which compartmentalize the storage area, the dust is free to spread out and remain loosely compacted so that the pressure of the dust on the confirming surfaces is reduced.

The above discussion deals only with the effect of volume and area on friction but does not deal with location of the region 4. It is apparent that the greatest proportion of the dust generated by threading the screw into the hole is produced at the maximum diameter convolutions of group 3. Thus it is essential that the convolutions that are relieved or reduced should be located immediately adjacent to the maximum diameter convolutions of group 3, to prevent distribution of dust along a small volume, large surface area portion of the screw. It has been found that if region 4 of the screw is located behind the first, second or third convolution of maximum diameter, satisfactory results are obtained. Specifically the dust produced by the maximum diameter convolutions of group 3 accumulates and is loosely compacted in the region 4 instead of travelling up the screw. These particles may, when the screw is fully inserted, substantially fill the region 4 (see FIG. 5) but if the region is of the proper size the dust will not produce undue binding. Some binding at the very end of insertion is permissible and even desirable since it increases the holding force. In any event a strong holding force is produced without fear of shearing the screw.

Another factor that must be considered is the dust produced by the convolutions of region 6 of the screw. These convolutions frictionally engage the grooves formed in the wall and as such produce further dusting although at a much slower rate than the convolutions which initially cut the grooves. The dust produced by the group 6 convolutions is found to be readily accommodated by the regions between the convolutions if a "spaced" thread is used. By "spaced" thread is meant a thread in which the distance along the axis of the screw between the roots of adjacent convolutions is approximately equal to the axial length of the cross-section of a convolution.

It should be noted from the diagrams of FIGS. 3–5 that as either the diameter of the screw or depth of insertion of the screw in the hole increases, the accumulation of dust increases. Therefore the diameter of the region 4 of the screw, i.e. either the degree to which convolutions are removed in the FIG. 1 embodiment, or the root-diameter of region 4 of the FIG. 2 embodiment, is decreased as the length or diameter of the screw is increased.

A series of tests have been conducted on the screw of the present invention. In these tests which are described below, a screw of the type illustrated in FIG. 6 was employed. This device differs from the screws of FIGS. 1 and 2 in that the three convolutions of the group 4 convolutions lying immediately adjacent the group 6 convolutions taper outwardly to the maximum diameter of convolutions 6. The tapering of these three convolutions serves to help realign the screw with the axis of the hole by exerting a gradually increasing side thrust on the screw as it is inserted to the point where the convolutions of group 6 approach the hole 8.

Figure 6:
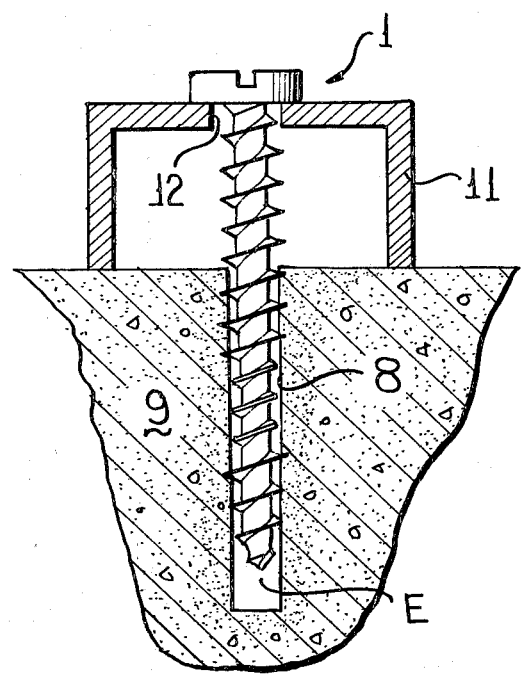
FIG. 6 is a diagrammatic view of a modified form of thread arrangement according to the present invention.

Eleven tests have been conducted on an assembly such as illustrated in FIG. 7, in some cases employing the screw of FIG. 6 of the present invention, and in other cases employing the prior art devices. The results of these tests are set forth under items 1 through 12 appearing immediately below. In the following description, the term "bridged" again means that a channel member such as 11, bridged the hole so that the head of the screw or the device to be anchored to the concrete did not directly apply a force against the upper surface of the concrete.

The tests were as follows:

1. ¼ inch × 1 ½ inch lag bolt, ½ inch × 1 ¼ inch lead shield, the shield was bridged on the surface. Results, the shield pulled loose with a maximum torque wrench reading of 5 foot pounds.

2. Same test as No. 1. Results, shield pulled loose with a maximum torque wrench reading of 2 ½ foot pounds.

3. ¼ inch × 1 ½ inch lag bolt, ⅜ inch × 1 ½ inch plastic shield, the shield was bridged on surface. Results, shield held well with inch pound torque wrench, reading top of wrench (50 inch pounds). Shield pulled, however, with foot pound wrench with a reading of 0.

4. Same test as No. 3. Results, same as No. 3. (50 inch pounds held well pulled with 0 foot pounds.)

5. ¼ inch × 1 ½ inch lag bolt with thread design of present invention. Results, the screw did not pull, but twisted off, sheared, with a maximum torque wrench reading of 20 foot pounds.

6. Same test as No. 5. Results, screw pulled loose with a maximum torque wrench reading of 22 foot pounds.

7. ⅛ inch × 1 ¼ inch sheet metal screw, ¼ inch × 1 inch lead shield, the shield was bridged on surface. Results, shield pulled loose with a maximum torque wrench reading of 24 inch pounds.

8. Same as No. 7. Results, shield pulled loose with a maximum torque wrench reading of 20 inch pounds.

9. ⅛ inch × 1 ½ inch sheet metal screw, ¼ inch × 1 inch plastic shield, the shield was bridged on the surface. Results, shield pulled with a maximum torque wrench reading of 20 inch pounds.

10. Same as No. 9. Results, shield pulled loose with a maximum torque wrench reading of 28 inch pounds.

11. ⅛ inch × 1 ¼ inch sheet metal screw with thread design of the present invention. Results, screw held well with a maximum torque wrench reading of 50 inch pounds.

An attempt was made to modify the foot pound wrench to the screw employed in test 11. However, the inventor was unable to adapt the wrench to the screw and therefore a foot pound test could not be conducted on the ⅛ inch × 1 ¼ inch screw as indicated in test 11. However, the screw held with the maximum torque wrench reading of 50 inch pounds.

Additional tests were conducted using unmodified sheet metal screws and lag bolts directly in the concrete. Specifically, an attempt was made to thread a ¼ inch × 1 ½ inch lag bolt directly into the concrete. Similarly, an attempt was made to thread a ¼ inch × 1 ⅛ inch sheet metal screw directly into the concrete. In both instances, the screw sheared before it could be fully inserted. When the convolutions were relieved in accordance with the present invention, the screws were readily inserted in concrete with the results indicated in the tests reported above.

The size of the hole into which the screw of the present invention is to be threaded is also a factor which must be determined. The diameter of the hole must lie between the root and maximum thread diameters of the screw so that the body of the screw does not bind in the hole while the convolutions can cut into the side of the hole. For instance, a screw with a root diameter of 11/64 inch and a thread diameter of 17/64 inch was threaded into a hole drilled with a 13/64 inch diameter drill. A screw having a root diameter of 7/64 inch and a thread diameter of 11/64 inch was threaded into a hole drilled with a drill having a diameter of ⅛ inch. The first example given above corresponds to a ¼ inch lag bolt and the latter example corresponds to a ⅛ inch sheet metal screw.

The holding force of the screw is a function of several factors all of which relate to the surface area of contact between the thread of the screw and the wall of the hole. One such factor is the diameter of the hole relative to the diameter of the screw shank. If these diameters are close to the same the holding force is large but not much storage area for the dust is provided. In this case the embodiment of FIG. 2 is preferred and it may be necessary to extend the region 4 to provide additional volume. The limit on this approach is the storage provided between convolutions in region 4.

Holding force is also aided by the accumulation of dust which forms a dust ring between the convolutions in region 4. As illustrated in FIGS. 3 and 4 of the accompanying drawings, when the screw is inserted in the hole, dust particles removed from the walls of the hole by the maximum diameter convolutions of group 3 gradually accumulate and become loosely compacted in the region 4. When the screw is fully inserted in the hole (see FIG. 5 of drawings) the dust particles have built up to full density and have become tightly compacted to form a ring of dust around the screw shank of region 4. This ring of dust produces a circle of pressure against the shank of the screw in region 4 and against the walls of the hole, thus aiding in the holding force of the screw.

The holding force may also be increased, of course, by increasing the length of the screw. Selection of diameters and screw lengths provides the user with a wide range of holding forces versus difficulty of insertion, determined primarily of course by the holding force required in a given application.

Tests were also conducted comparing the holding force of the screw of the present invention with the prior art shield devices where the shield was not bridged; that is, the piece being secured to the concrete pressed against the top of the shield. In all instances, the screw of the present invention performed noticeably better than the shield devices and in many instances performance of the invention screw was far superior. The shield devices failed as a result of stripping the ridges of the shield or due to slippage of the shield in the hole. The latter form of failure was more common. If equal holding forces could be achieved, the device of the present invention is far superior due to cost and time savings.

While I have described and illustrated several specific embodiments of my invention, it will be clear that variations of the details of construction which are specifically illustrated and described may be resorted to without departing from the true spirit and scope of the invention as defined in the appended claims.

I claim:

1. A screw for anchoring objects to a body of concrete, brick or like dusting materials by being threaded directly into a hole of a predetermined diameter in the body, said screw comprising an elongated body of lesser diameter than said hole and having a generally sharp end, an opposite end and a sharp-crested single thread having a maximum diameter larger than the diameter of the hole into which it is to be inserted and extending from adjacent one of said ends to adjacent the other of said ends, said thread having convolutions which are spaced from one another at their roots by a distance at least as great as the axial, cross-sectional length of a single convolution, each convolution of said thread forming an acute angle with the axis of said screw such that said screw can be inserted into the hole only by applying a rotative force thereto, said thread having three distinct regions arranged along the axis of said screw, a first region adjacent said sharp end, a second region adjacent said opposite end and a third region lying between said other regions, said first region including a plurality of convolutions increasing from a minimum diameter at said pointed end to approximately maximum diameter of said thread, said first region having at the maximum three convolutions of approximately maximum diameter, convolutions of said second region being of approximately maximum diameter, said third region having at least two convolutions, said convolutions of said third region having a maximum diameter lying in a range from the root diameter of said thread and a diameter less than the diameter of said hole, the diameter of the convolutions of said third region and the spacing therebetween comprising means for loosely storing the material removed from the wall of the hole during threading of said screw into the hole.

2. A screw for anchoring objects to concrete, brick or like dusting materials by being threaded directly into a hole of a predetermined diameter in said material, said screw comprising an elongated body of lesser diameter than said hole and having a generally sharp end, an opposite end and a sharp-crested single thread having a maximum diameter larger than the diameter of the hole into which it is to be inserted, and extending from adjacent one of said ends to adjacent the other of said ends, said thread having convolutions which are spaced from one another at their roots by a distance approximately as great as the axial, cross-sectional length of a single convolution, each convolution of said thread forming an acute angle with the axis of said screw such that said screw can be inserted into the hole only by applying a rotative force thereto, said thread having three distinct regions arranged along the axis of said screw, a first region adjacent said sharp end, a second region adjacent said opposite end and a third region lying between said other regions, said first region including a plurality of convolutions increasing from a minimum diameter at said pointed end to approximately maximum diameter of said thread, said first region having at the maximum three convolutions of approximately maximum diameter, convolutions of said second region being of approximately maximum diameter, and said third region having at least two convolutions, said convolutions of said third region having a maximum diameter lying in a range from the root diameter of said thread and a diameter less than the diameter of said hole, the diameter of the convolutions of said third region and the spacing therebetween comprising means for loosely storing the material removed from the wall of the hole during threading of said screw into the hole.

3. The combination according to claim 2 wherein the convolutions of said third region adjacent said second region increase in diameter from the diameter of said third region to the maximum diameter of the convolutions of said second region.

4. The combination according to claim 2 wherein the hole in the material has a predetermined depth and wherein the screw is intended to pass through a hole in a wall of an object located a predetermined distance above the surface of the material, said screw being of such axial length that at least four convolutions of said second region enter the hole in the material and engage the material defining the side of the hole.

5. In combination a body of concrete, brick or like dusting material having a hole of a predetermined diameter formed therein and a screw which may be threaded directly into the hole in said body, said screw comprising an elongated body having a generally sharp end, an opposite end adapted to receive a device for rotating said screw and a sharp-crested single case-hardened thread of a maximum diameter greater than the diameter of the hole and a root diameter less than the diameter of the hole, extending from adjacent one of said ends to adjacent the other of said ends, said screw having threads of a pitch such that the screw must be inserted into the hole by rotation, said thread having three distinct regions arranged along the axis of said screw, a first region adjacent said sharp end, a second region adjacent said opposite end and a third region lying between said other regions, said first region including a plurality of convolutions increasing from a minimum diameter at said pointed end to approximately the maximum diameter of said thread, said first region having at the maximum three convolutions of approximately maximum diameter, the majority of said convolutions of said second region being of approximately maximum diameter, said third region having at least two convolutions, said convolutions having a maximum thread diameter lying in a range from the root diameter of said thread and a diameter greater than said root diameter and less than the diameter of the hole, said convolutions being spaced from one another by a distance such as to accommodate in loosely compacted form between the convolutions of said third region, the dust created by the convolutions of said first region during insertion of said screw in said body.

6. The combination according to claim 5 wherein the volume of space defined between the convolutions of said second region of said screw and the wall of the hole in said body is such as to accommodate in generally loosely compacted form, the dust created by the convolutions of said second region upon insertion of said screw in said body.

7. In combination a body of concrete, brick or like dusting material having a hole of a predetermined diameter formed therein and a screw which may be threaded directly into the hole in said body, said screw comprising an elongated body having a generally sharp end, an opposite end adapted to receive a device for rotating said screw and a sharp-crested single case-hardened thread of a maximum diameter greater than the diameter of the hole and a root diameter less than the diameter of the hole, extending from adjacent one of said ends to adjacent the other of said ends, said screw having threads of a pitch such that the screw must be inserted into the hole by rotation, said thread having three distinct regions arranged along the axis of said screw, a first region adjacent said sharp end, a second region adjacent said opposite end and a third region lying between said other regions, said first region including a plurality of convolutions increasing from a minimum diameter at said pointed end to approximately the maximum diameter of said thread, said first region having at the maximum two convolutions of approximately maximum diameter, the majority of said convolutions of said second region being of approximately maximum diameter, said third region having at least two convolutions, said convolutions having a maximum thread diameter lying in a range from the root diameter of said thread and a diameter greater than said root diameter and less than the diameter of the hole, said convolutions being spaced from one another by a distance such as to accommodate in loosely compacted form between the convolutions of said third region, the dust created by the convolutions of said first region during insertion of said screw in said body.

\* \* \* \* \*